Feb. 21, 1956 — L. L. BEERY — 2,735,472
ANTISKID DEVICE FOR VEHICLE TIRES
Filed Oct. 11, 1952

INVENTOR
LAMBERT L. BEERY
Caswell & Lagaard
ATTORNEYS

United States Patent Office 2,735,472
Patented Feb. 21, 1956

2,735,472

ANTISKID DEVICE FOR VEHICLE TIRES

Lambert L. Beery, St. Paul, Minn.

Application October 11, 1952, Serial No. 314,382

3 Claims. (Cl. 152—242)

The herein disclosed invention relates to anti-skid devices for vehicle tires and has for an object to provide a device which can be applied to a tire without jacking up the wheel on which the tire is mounted or without moving the vehicle.

Another object of the invention resides in providing a device which can be collapsed to occupy a minimum amount of space when not in use.

An object of the invention resides in providing a device in which cross chains are employed and in which the cross chains are disposed at localities about the tire substantially one hundred and twenty degrees apart.

A still further object of the invention resides in providing a device in which pairs of cross chains are employed at each locality.

A feature of the invention resides in providing the device with an elongated flexible member, preferably a chain, disposed on the outer side of the tire and to which the cross chains are attached, said chain having loose ends and in further providing a connector between the ends of said chain.

An object of the invention resides in providing a partial ring on the inner side of the tire and constructed with two sections, pivoted together at their adjoining ends and each extending about the tire substantially one hundred and twenty degrees.

Another object of the invention resides in attaching the cross chains to said sections substantially at the ends thereof.

A still further object of the invention resides in providing a pivoted joint between said sections, and a jointed link pivoted thereto intermediate their ends, and permitting collapsing of the partial ring into compact form.

Other objects of the invention reside in the novel combination and arrangement of parts and in the details of construction hereinafter illustrated and/or described.

Figure 1:
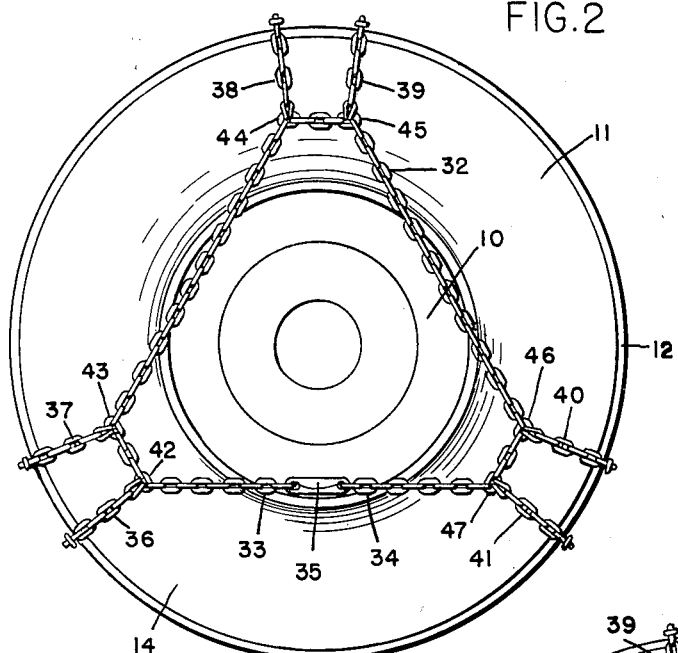
Fig. 1 is an elevational view of a vehicle wheel and tire viewed from the inner side of the wheel and illustrating an embodiment of the invention applied thereto.

In the drawings a vehicle tire has been shown and on which the anti-skid device has been mounted. This device consists of a two section partial ring adapted to be inserted over the tire and placed adjacent the inner surface thereof. This partial ring is constructed with two arcuate sections pivoted together at their adjoining ends and each extending along the tire for a distance equal to about one hundred and twenty degrees. These sections have pivoted to them intermediate their ends a jointed link which limits the extension of said sections but which permits of collapsing the same into compact form. On the other side of the tire is an elongated flexible member which is illustrated as a chain and which has loose ends. A number of cross links are connected to this chain and extend about the tire and are further connected to said sections of the partial ring near their ends. A connector secures the ends of the chain together.

For the purpose of illustrating the application of the invention, a portion of a vehicle wheel 10 is shown and on which is mounted a pneumatic tire 11. This tire is of ordinary construction and is formed with a tread 12, an inner side 13 and an outer side 14.

The invention proper consists of a partial ring 15 constructed of two arcuate sections 16 and 17. These sections are pivoted together at one end of each thereof by means of a rivet 18 which extends jointly through said sections. Each of the sections 16 and 17 extends for a distance of approximately 120 degrees about the tire, the ends 51 and 52 thereof are separated to form an opening 48 formed between, which permits of applying the device to the vehicle tire as will be presently described. In close proximity to the ends of these sections are formed slots 20, 21, 22, 23, 24 and 25. Extending between the two sections is a jointed link 26 which comprises two bars 27 and 28 pivotally connected together by means of a rivet 29 extending through the same. The ends of these bars are pivoted to the two sections 16 and 17 of the partial ring 15 intermediate the ends thereof by means of rivets 31 which pass through said bars and sections.

On the outer side 14 of the tire is disposed a chain 32 which has loose ends 33 and 34. These ends are adapted to be connected together by means of a connector 35 which may be of any desired construction.

Figure 2:
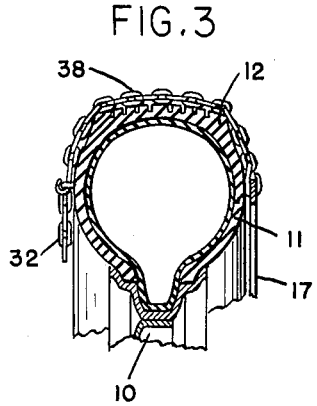
Fig. 2 is a view similar to Fig. 1 and viewed from the outer side of the wheel and tire.
Figure 3:
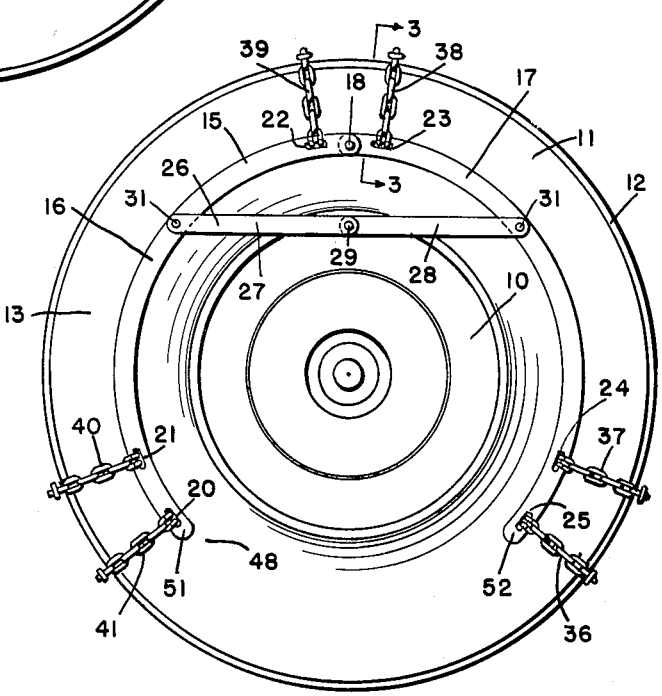
Fig. 3 is a cross sectional view taken on line 3—3 of Fig. 1.
Figure 4:
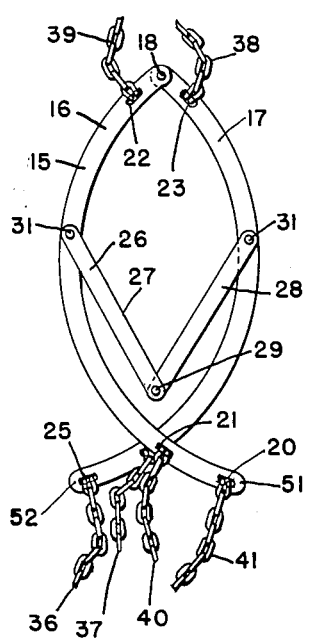
Fig. 4 is a plan view of the device showing the device removed from the tire and with the partial ring in collapsed position.

Extending around the tread 12 of the tire are a number of cross chains 36, 37, 38, 39, 40 and 41. These cross chains are hooked into the slots 21, 22, 23, 24 and 25 of the partial ring 15 respectively and into links 42, 43, 44, 45, 46 and 47 of the chain 32. When the connector 35 is applied the anti-skid device is held mounted on the tire as shown in Figs. 1, 2 and 3.

The method of using the invention is as follows: Without jacking up the wheels of the vehicle to which the device is to be applied, the partial ring 15 is opened up and placed on the upper portion of the tire and with the ends 51 and 52 of the sections 16 and 17 directed downwardly toward the inner side of the tire. The opening 48 between the ends 51 and 52 of the sections 16 and 17 permit of slipping the partial ring past the brake and axle housing of the wheel. As the partial ring is moved into the position shown in Fig. 2, the cross chains 36, 37, 40 and 41 slide along the tread of the tire until the same are in their final positions. During the application of the device the connector 35 is unattached and the said cross chains are free to move to the said positions. When the chains 38 and 39 rest on the tread of the tire, the said chains hold the partial ring 15 supported in proper position. Without shifting the position of the vehicle, the ends 33 and 34 of the chain 32 may be connected together by means of the connector 35. Since the pairs of cross chains are disposed 120 degrees apart, the outward pull on the partial ring 15 is equal in all directions and the device will not become disengaged from the tire. Upon removal of the device, the procedure is simply the reverse of that described for its application.

The advantages of the invention are manifest. The device can be easily and quickly applied to existing vehicle tires without jacking up the wheels or without shifting the position of the vehicle. It is thus possible to apply the device to the tires where the vehicle is stuck and could not be moved and where it is difficult to apply a jack under the wheels. When not in use, the partial ring may be collapsed to occupy a minimum amount of space so that the same can be readily stored away in the trunk of the vehicle.

Changes in the specific form of the invention, as herein described, may be made within the scope of what is claimed without departing from the spirit of the invention.

Having described the invention, what is claimed as new and desired to be protected by Letters Patent is:

1. An anti-skid device for a vehicle tire applicable to a wheel having a brake drum, said device comprising two elongated rigid members connected together at adjacent ends thereof and arranged in diverging relation, with the free ends spread apart, the ends of said members lying substantially at the apexes of an equilateral triangle, said rigid members being adapted to be inserted over the tire and being spaced outwardly from the brake drum, a link connected to said members, respectively, at localities between the middles of said members and the connected ends thereof and nearer the middles of said members, respectively, than the connected ends to bring said link outwardly of and adjacent to said brake drum, an elongated flexible member on the outer side of the tire and having loose ends, cross chains extending laterally about the tire and connected to said rigid members at the ends thereof and to said flexible member and means for securing the ends of said flexible member together.

2. An anti-skid device for a vehicle tire comprising a partial ring adapted to be inserted over the tire and disposed on the inner side of the tire and consisting of two elongated sections pivoted together at their adjacent ends, each section extending for a distance of substantially one hundred and twenty degrees about the tire, a jointed link comprising two bars pivoted together and connected to said sections respectively intermediate their ends and movable into alignment when the ring sections are in extended position to limit swinging movement of the ring sections to operative extended position, a side chain on the outer side of the tire and having loose ends, cross chains extending laterally about the tire and connected to said partial ring at the ends of the sections thereof and to said side chain, and a connector between the ends of said side chain.

3. An anti-skid device for a vehicle tire applicable to a wheel having a brake drum, said device comprising a partial ring adapted to be inserted over the tire and disposed on the inner side of the tire and consisting of two elongated rigid sections pivoted together at their adjacent ends, a jointed link comprising two bars, pivot means between one end of each of said bars and pivoting said bars together, pivot means between the other end of said bars and said partial ring sections, respectively, said bars being of such length that when extended, the distance between the free ends of the partial ring sections is greater than the diameter of said brake drum, said last named pivot means being disposed nearer the middle of said partial ring sections than the pivoted ends of said sections to bring said link between the brake drum of the wheel and the pivoted ends of said partial ring sections, an elongated flexible member on the outer side of the tire and having loose ends, cross chains extending laterally about the tire and connected to said partial ring at the ends of said sections thereof and to said flexible member and means for securing the ends of said flexible member together.

References Cited in the file of this patent

UNITED STATES PATENTS

| | | |
|---|---|---|
| 1,511,685 | Spiro | Oct. 14, 1924 |
| 2,082,937 | Bambenek | June 8, 1937 |
| 2,326,618 | Carlson | Aug. 10, 1943 |
| 2,328,808 | Holtz | Sept. 7, 1943 |
| 2,396,532 | Roff | Mar. 12, 1946 |
| 2,594,068 | Pike | Apr. 22, 1952 |
| 2,639,753 | Pike | May 26, 1953 |
| 2,657,728 | Jackson | Nov. 3, 1953 |